UNITED STATES PATENT OFFICE.

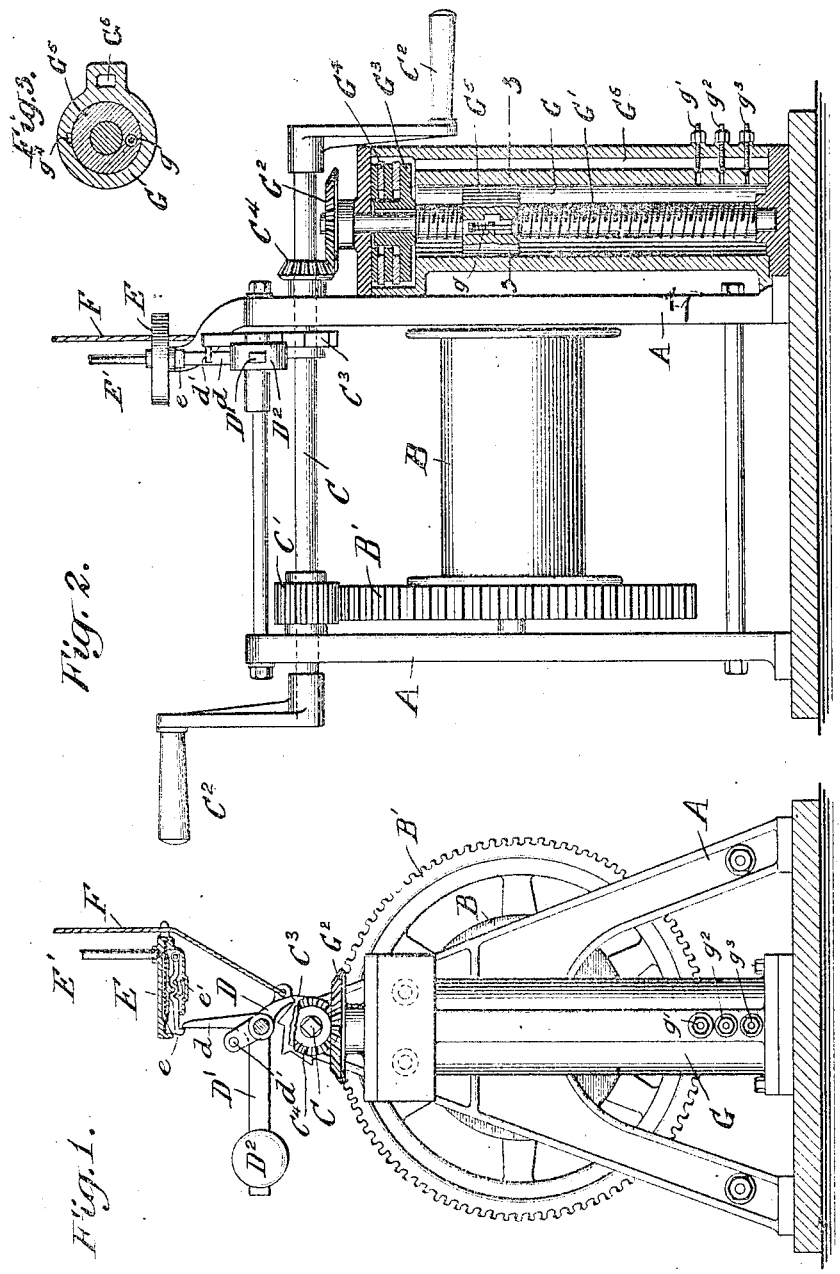

ANDREW M. COYLE, OF NEW YORK, N. Y., ASSIGNOR TO OTIS ELEVATOR COMPANY, OF JERSEY CITY, NEW JERSEY, A CORPORATION OF NEW JERSEY.

DASH-POT.

No. 838,169.  Specification of Letters Patent.  Patented Dec. 11, 1906.

Application filed June 18, 1905. Serial No. 270,301.

*To all whom it may concern:*

Be it known that I, ANDREW M. COYLE, a citizen of the United States, and a resident of the city of New York, in the county and State of New York, have invented new and useful Improvements in Dash-Pots for Hoists, of which the following is a specification.

My present invention relates to dash-pots for preventing jars and shocks in the operation of machinery of any kind, and is particularly applicable to dash-pots used in connection with hoists.

It embraces also certain peculiarities of construction which I believe to be new and useful; but in its broader aspects it is not confined to these particular features.

A difficulty which has attended the use of retarding devices, such as dash-pots, with hoisting apparatus has been that the dash-pot as ordinarily constructed is capable only of reciprocating motion. The forms which have been developed have been adapted to steam-engine work, for example, in which the parts move repeatedly over a relatively short stroke. Such devices are wholly unsuitable for use with hoists, because in general the path of the moving parts in a hoist is a very long one and the use of a dash-pot of coincident length is prohibited by expense and mechanical difficulty, such as keeping the parts in alinement.

Another form of retarding device which has been used to some extent is one in which vanes like those of a propeller move in a closed chamber filled with a viscous liquid, such as oil or glycerin. While this is capable of operation, it is effective only for relatively small powers unless made prohibitively large, since the oil or other liquid acquires a rotary motion within the cylindrical case and revolves with the blades which it is meant to retard, the only effect being that due to inertia.

For these devices I substitute a dash-pot which (in the form in which it is illustrated in this application) consists of a cylinder and piston with intermediate devices gearing it to the drum or other moving part of the hoist. The best way in which it has occurred to me to embody the invention is to have the piston to act as the nut and the piston-rod to be screw-threaded and rotate, thus combining a slow motion of the piston with a relatively short travel compared with that of the rope upon the drum.

The piston reciprocates in oil, and as the described arrangement gears down the motion, if the oil alone were relied upon to check the motion of the piston, it would give rise to excessive pressures and the apparatus would have to be of great weight and cost in order to stand the strain. For this reason I combine with the piston-rod a friction device which will substantially assist in retarding its rotation. In this application the friction device consists of a series of interleaved disks, some of which are attached to the piston-rod and some of which are loose, but are prevented from rotation by any suitable loose connection with the case of the dash-pot. By this arrangement the pressure of the oil forces the disks together, and the friction between them, when under pressure, acts to materially retard the rotation of the piston-rod and diminishes the strain upon the whole apparatus. I regard this as a very important feature of my invention.

The gears between the dash-pot and the drum may be so selected as to give any desired ratio between their movements, this being limited only by the strength of materials composing the apparatus. As a further protection against sudden shocks at the end of the stroke—as, for example, at the bottom of shaft—I arrange a by-pass for the fluid which fills the cylinder and adjustable vents, which are in succession covered by the piston as it approaches the end of its stroke. I prefer to make these vents of progressively-decreasing size, so that the retardation effected by the dash-pot will be progressively increased as it nears the end of its stroke. It is manifest that when the last vent is covered by the piston the motion of the hoist will cease, at least in those forms of the device in which a liquid is employed as the retarding medium in the cylinder.

The accompanying drawings show my invention, Figure 1 being a side elevation, and Fig. 2 an end view with the dash-pot shown in longitudinal section. Fig. 3 is a sectional plan on line 3 3 of Fig. 2 of the dash-pot and piston.

A is the frame of the hoist. B is the drum, to which is attached the pinion B'. C is a shaft carrying the gear C' and rotated by the cranks C² C². C³ is a ratchet engaging with the pawl D. The parts so far described are all old and well known. Of course any power may be applied to the hoist—steam, electric, or other.

At E, I show a device designed to release the pawl D upon occasion and consisting of a chamber supplied with compressed air through the pipe E'. A latch $e$ is forced downward by the pressure of the compressed air upon the diaphragm, and when its pressure is released for any reason a spring $e'$ forces up the latch $e$. D' is a bell-crank lever carrying the weight $D^2$. The arm $d$ of the bell-crank lever engages with the latch $e$ of the compressed-air device. A pin $d'$ is fast to the heel of the pawl D. The pawl is also capable of manual operation by means of the rope F.

The operation of these parts is as follows: When the pressure is released from the pipe E', the latch $e$ rises, the lever D' is released, and the weight in falling brings the arm $d$ of the lever against the pin $d'$, striking it a hammer-blow and forcing the pawl out of engagement with the ratchet, releasing the drum, and permitting the hoist-rope (not illustrated) to unwind. This part of the device is described and claimed in my pending application already hereinbefore referred to, and I therefore make no claim for it in this case. Upon the shaft C is the driving-gear $C^4$, meshing with the gear $G^2$. The latter is keyed to the shaft G', rotating in bearings in the cylinder G. This shaft is screw-threaded, and upon it is the threaded piston $G^5$. To retard the motion of the shaft and piston, a brake comprising a system of rings $G^3 G^4$ is provided at the top of the cylinder. The rings $G^4 G^4$ are prevented from turning in the cylinder by splines, (not illustrated,) and the rings $G^3 G^3$ are caused to rotate with the shaft by means of splines securing them to it. In the piston is a valve $g$, which permits the oil, with which I prefer to fill the cylinder, to flow freely in one direction through the piston, thus throwing the dash-pot out of action while the hoist is lifting its load. A by-pass $G^6$ is provided, and the rate of flow of the oil from one end of the cylinder to the other is regulated by means of the vents $g' g^2 g^3$ between the cylinder and the by-pass. These are, as already indicated in my statement of invention, preferably of progressively-decreasing size, the vent $g'$ being larger than the vent $g^2$, &c., and as the piston descends it covers them successively, thus progressively increasing the retardation of the load as it approaches the end of its travel.

It should be noted that at all times excessive speed of the hoist is prevented, in that when the speed of the dash-pot piston is increased the back pressure of the oil or other fluid beneath the same is increased, and consequently the brake is more or less applied. The dash-pot mechanism therefore coacts with the brake to regulate or govern the speed of rotation of the hoisting-drum or the speed of travel of the load.

Of course, the valve $g$ may be omitted from the piston if it is desired to make the dash-pot operative in both directions, as may sometimes be the case, and the vents $g'$, &c., and friction devices may be employed at both ends of the cylinder without departing from the invention, the modifications in shape and arrangement made necessary by the change being evident to an engineer.

In order to prevent the turning in the cylinder of the piston $G^5$ from its friction on the screw, the arrangement shown in Fig. 3 or any similar one may be adopted. In that figure the parts are as before, except that a slot is shown in the wall of the cylinder G, in which a spline $G^4$, attached to the piston $G^5$, may reciprocate.

Having thus described my invention, what I claim, and wish to protect by Letters Patent of the United States, is—

1. The combination of a dash-pot, a friction-brake coöperating therewith to retard a moving part in proportion to the speed thereof, and means, operated by the dash-pot mechanism, for actuating the brake.

2. The combination of a dash-pot, a friction-brake coöperating therewith to retard a moving part, and means within the dash-pot and operated by the fluid-pressure, for actuating the brake.

3. The combination of a dash-pot comprising a piston and a single cylinder, with means for opposing the motion of the piston by fluid-pressure, and means for opposing to its motion a frictional resistance.

4. The combination, with a dash-pot having a part thereof geared to a rotating mechanism, of a braking device composed of a number of disks, means for rotating some of the disks, and means, operated by the fluid-pressure in the dash-pot, for forcing the disks together.

5. In a dash-pot, the combination of a piston and cylinder, a rotating screw-threaded piston-rod operating the piston by a thread passing therethrough, and means for progressively increasing the retardation of the piston as it approaches the end of its stroke.

6. In a dash-pot, the combination of a threaded piston, a cylinder and a rotating threaded piston-rod, with a by-pass and a plurality of adjustable vents between the by-pass and the cylinder.

7. In a dash-pot, the combination of a cylinder, a threaded piston, and a piston-rod, with a by-pass and a series of vents between the cylinder and the by-pass arranged in the path of the piston; the length of the piston being such that it successively covers all of the vents.

8. In a dash-pot, the combination of a cylinder, a piston and a rotating screw-threaded piston-rod passing therethrough, with a by-pass and a series of vents of progressively-decreasing size between the cylinder and the by-pass, the vents being arranged in the path of the piston so that they shall all be successively covered by it as it reaches the end of its stroke.

9. The combination of a dash-pot, and a brake within said dash-pot.

10. The combination of a dash-pot, and a friction-brake inclosed thereby and coöperating therewith to positively retard a moving part.

11. The combination with a dash-pot, of a brake coöperating therewith to retard a moving part, and means for governing the application of the brake in proportion to the speed of said moving part.

12. The combination with a dash-pot, of a brake, and means connecting the dash-pot and brake to regulate the application of said brake to a moving part in proportion to the speed thereof.

13. The combination with dash-pot mechanism, of a friction-brake inclosed thereby and coöperating therewith, and means comprising a by-pass and a series of adjustable vents for effecting a regulation or governing of the application of said brake.

14. The combination with a dash-pot, of a brake, and means effecting the variable application of said brake to a moving part to regulate the speed thereof.

15. The combination with dash-pot mechanism, of a friction-brake inclosed thereby, and means for effecting a variable retardation of a moving part by the application of said brake.

16. The combination with a dash-pot piston, of a receptacle therefor, a rotary piston-rod, a brake, and means effecting the application of said brake to check the rotation of said piston-rod.

17. The combination of a dash-pot stop-motion apparatus for a moving body, and a brake inclosed by said dash-pot apparatus and coöperating therewith.

18. The combination with a hoist, of dash-pot screw stop-motion apparatus therefor, and a brake coacting with said stop-motion apparatus to effect a gradual stopping of the hoist at a predetermined point in its travel.

19. In a dash-pot, the combination of a cylinder and piston, a rotating threaded piston-rod operating the piston, and a friction-brake retarding the rotation of the piston-rod.

20. In a dash-pot, the combination of a cylinder, a piston, a rotating threaded piston-rod operating the piston, and a series of interleaved friction-disks, forming a brake to resist the rotation of the piston-rod.

21. In a dash-pot, the combination of a piston and a cylinder containing fluid, a rotating threaded piston-rod operating the piston, and a series of interleaved friction-disks, some of which rotate with the piston-rod, and some of which are held against rotation; the pressure of the fluid in the dash-pot forcing the disks together and causing them to operate as a brake upon the rotation of the piston-rod.

ANDREW M. COYLE.

Witnesses:
T. J. JOHNSTON,
MARY AGNES NELSON.